United States Patent
Banholzer

(10) Patent No.: US 11,518,018 B2
(45) Date of Patent: Dec. 6, 2022

(54) POWER TOOL WITH NON-CONDUCTIVE DRIVESHAFT

(71) Applicant: MILWAUKEE ELECTRIC TOOL CORPORATION, Brookfield, WI (US)

(72) Inventor: Hans T. Banholzer, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 506 days.

(21) Appl. No.: 16/747,676

(22) Filed: Jan. 21, 2020

(65) Prior Publication Data

US 2020/0230798 A1 Jul. 23, 2020

Related U.S. Application Data

(60) Provisional application No. 62/794,871, filed on Jan. 21, 2019.

(51) Int. Cl.
*B25F 5/02* (2006.01)
*A01G 3/08* (2006.01)

(52) U.S. Cl.
CPC .............. *B25F 5/02* (2013.01); *A01G 3/086* (2013.01)

(58) Field of Classification Search
CPC ........... B25F 5/02; F16C 1/06; F16C 2310/00
See application file for complete search history.

(56) References Cited

U.S. PATENT DOCUMENTS

| | | | |
|---|---|---|---|
| 2,611,512 | A | 9/1952 | Alexander |
| 3,476,960 | A | 11/1969 | Rees |
| 3,604,573 | A | 9/1971 | Leitch |
| 3,617,034 | A | 11/1971 | Skinner |
| 3,625,292 | A | 12/1971 | Lay |
| 3,639,789 | A | 2/1972 | Bednarski |
| 3,657,813 | A | 4/1972 | Knight |
| 3,737,987 | A | 6/1973 | Bednarski |
| 3,737,988 | A | 6/1973 | Bednarski |
| 3,747,800 | A | 7/1973 | Viland |
| 3,750,730 | A | 8/1973 | Dorsch |
| 3,779,420 | A | 12/1973 | Knaus |
| 3,838,795 | A | 10/1974 | Berg |

(Continued)

FOREIGN PATENT DOCUMENTS

| | | |
|---|---|---|
| CN | 2900911 Y | 5/2007 |
| CN | 101006763 A | 8/2007 |

(Continued)

*Primary Examiner* — Eyamindae C Jallow
(74) *Attorney, Agent, or Firm* — Michael Best & Friedrich LLP

(57) ABSTRACT

A power tool includes an elongated shaft forming a handle and a tool head located at one end of the handle. The tool head includes a working element and a driven shaft configured to drive the working element. A powerhead located at an opposite end of the handle and includes an input shaft. A driveshaft extends between the tool head and the powerhead. The driveshaft is rotatably coupled to the input shaft and the driven shaft to transfer torque from the powerhead to the working element of the tool head. At least a portion of the driveshaft extending between the powerhead and the working element is constructed of a non-conductive material to inhibit transmission of electricity from the working element to the powerhead.

20 Claims, 8 Drawing Sheets

(56) References Cited

U.S. PATENT DOCUMENTS

| | | |
|---|---|---|
| 3,845,841 A | 11/1974 | Kloefkorn |
| 3,917,117 A | 11/1975 | Plotsky |
| 3,968,896 A | 7/1976 | Giacoletti et al. |
| 3,983,857 A | 10/1976 | O'Connor |
| 4,062,156 A | 12/1977 | Roth |
| 4,135,562 A | 1/1979 | Martineau et al. |
| 4,142,756 A | 3/1979 | Henning et al. |
| 4,168,012 A | 9/1979 | Hawkinson |
| 4,168,687 A | 9/1979 | Kurahashi et al. |
| 4,172,573 A | 10/1979 | Moore et al. |
| 4,178,894 A | 12/1979 | Nau |
| 4,337,873 A | 7/1982 | Johnson |
| 4,360,124 A | 11/1982 | Knaus et al. |
| 4,463,498 A | 8/1984 | Everts |
| 4,505,040 A | 3/1985 | Everts |
| 4,616,128 A | 10/1986 | Case |
| 4,654,971 A | 4/1987 | Fettes et al. |
| 4,676,463 A | 6/1987 | Tansill |
| 4,733,471 A | 3/1988 | Rahe |
| 4,750,518 A | 6/1988 | Griffin et al. |
| 4,793,197 A | 12/1988 | Petrovsky |
| 4,794,273 A | 12/1988 | McCullough et al. |
| 4,833,973 A | 5/1989 | Wang |
| 4,899,446 A | 2/1990 | Akiba et al. |
| 4,916,818 A | 4/1990 | Panek |
| 4,924,573 A | 5/1990 | Huddleston et al. |
| 4,948,070 A | 8/1990 | Lyman |
| 4,991,298 A | 2/1991 | Matre |
| 5,013,282 A | 5/1991 | Keller |
| 5,163,650 A | 11/1992 | Adams et al. |
| 5,269,733 A | 12/1993 | Anthony, III |
| 5,615,855 A | 4/1997 | Marue et al. |
| 5,662,428 A | 9/1997 | Wilson |
| 5,718,050 A | 2/1998 | Keller et al. |
| 5,819,418 A | 10/1998 | Uhl |
| 5,913,451 A | 6/1999 | Madison |
| 5,926,961 A | 7/1999 | Uhl |
| 5,933,966 A | 8/1999 | Yates et al. |
| 6,111,187 A | 8/2000 | Goyette |
| 6,155,448 A | 12/2000 | Ishikawa et al. |
| 6,182,367 B1 | 2/2001 | Janczak |
| 6,722,041 B2 | 4/2004 | Warashina et al. |
| 6,739,058 B2 | 5/2004 | Warashina et al. |
| 6,754,963 B2 | 6/2004 | Warashina et al. |
| 6,880,248 B2 | 4/2005 | Weissert et al. |
| 7,296,600 B2 | 11/2007 | Ferreria et al. |
| 7,449,810 B2 | 11/2008 | Yokota et al. |
| 7,913,403 B1 | 3/2011 | Willetts |
| 8,136,254 B2 | 3/2012 | Gieske et al. |
| 8,191,268 B2 | 6/2012 | Willetts |
| 8,253,285 B2 | 8/2012 | Yoshida et al. |
| 8,541,913 B2 | 9/2013 | Yoshida et al. |
| 8,574,037 B2 | 11/2013 | Kresge |
| 8,769,829 B2 | 7/2014 | Pellenc |
| 8,882,166 B2 | 11/2014 | Ramsey et al. |
| 9,009,920 B1 | 4/2015 | Ramsey et al. |
| 9,009,921 B1 | 4/2015 | Ramsey et al. |
| 9,220,201 B2 | 12/2015 | Kratzig et al. |
| 9,309,844 B2 | 4/2016 | McLain |
| 9,391,491 B2 | 7/2016 | Yoshida et al. |
| 9,591,809 B2 | 3/2017 | Gieske et al. |
| 9,630,489 B2 | 4/2017 | Shimokawa |
| 9,876,201 B2 | 1/2018 | Ishikawa et al. |
| 9,897,135 B2 | 2/2018 | Miyakawa |
| 10,188,044 B1 | 1/2019 | Blackburn, Jr. |
| 10,302,142 B2 | 5/2019 | Densborn et al. |
| 11,130,400 B2 | 9/2021 | Esser |
| 2001/0032624 A1 | 10/2001 | Perry |
| 2002/0036204 A1 | 3/2002 | Miura et al. |
| 2003/0199327 A1* | 10/2003 | Sasaki .................... F16F 15/10 464/170 |
| 2003/0229993 A1 | 12/2003 | Agne |
| 2005/0023236 A1 | 2/2005 | Adams et al. |
| 2006/0157117 A1 | 7/2006 | Scott |
| 2006/0201076 A1 | 9/2006 | Blackwelder |
| 2007/0051740 A1 | 3/2007 | Huang |
| 2007/0199957 A1 | 8/2007 | Wu et al. |
| 2008/0184568 A1 | 8/2008 | Gieske et al. |
| 2008/0236124 A1 | 10/2008 | Heinzelmann |
| 2011/0162214 A1 | 7/2011 | Codeluppi |
| 2013/0048639 A1 | 2/2013 | Wiese et al. |
| 2014/0069240 A1 | 3/2014 | Dauvin et al. |
| 2016/0238082 A1 | 8/2016 | Densborn et al. |
| 2016/0318171 A1 | 11/2016 | Gonzales |
| 2017/0002860 A1* | 1/2017 | Davis ....................... F16C 1/06 |
| 2017/0002861 A1* | 1/2017 | Davis .................. A01D 34/905 |
| 2017/0079215 A1 | 3/2017 | Bian et al. |
| 2017/0232601 A1 | 8/2017 | Gieske et al. |
| 2017/0295721 A1 | 10/2017 | Carl |
| 2018/0119726 A1 | 5/2018 | Weissert et al. |
| 2018/0147712 A1 | 5/2018 | Hita |
| 2018/0177135 A1 | 6/2018 | Fu |
| 2020/0047610 A1 | 2/2020 | Freytag et al. |

FOREIGN PATENT DOCUMENTS

| | | |
|---|---|---|
| CN | 201044581 Y | 4/2008 |
| CN | 201579743 U | 9/2010 |
| CN | 102079073 A1 | 6/2011 |
| CN | 201913627 U | 8/2011 |
| CN | 202524761 U | 11/2012 |
| CN | 104675439 A | 6/2015 |
| CN | 105453911 A | 4/2016 |
| CN | 205454778 U | 8/2016 |
| CN | 106900386 A | 6/2017 |
| CN | 108142138 A | 6/2018 |
| DE | 2413974 A1 | 9/1974 |
| DE | 3213185 A1 | 10/1983 |
| DE | 10313372 A1 | 10/2004 |
| DE | 10313675 A1 | 10/2004 |
| DE | 102012203221 A1 | 9/2013 |
| EP | 0192469 A2 | 8/1986 |
| GB | 1180289 * | 2/1970 |
| WO | 2013097778 A1 | 7/2013 |
| WO | 2016056884 A1 | 4/2016 |
| WO | 2016184959 A1 | 11/2016 |
| WO | 2018204468 A1 | 11/2018 |

* cited by examiner

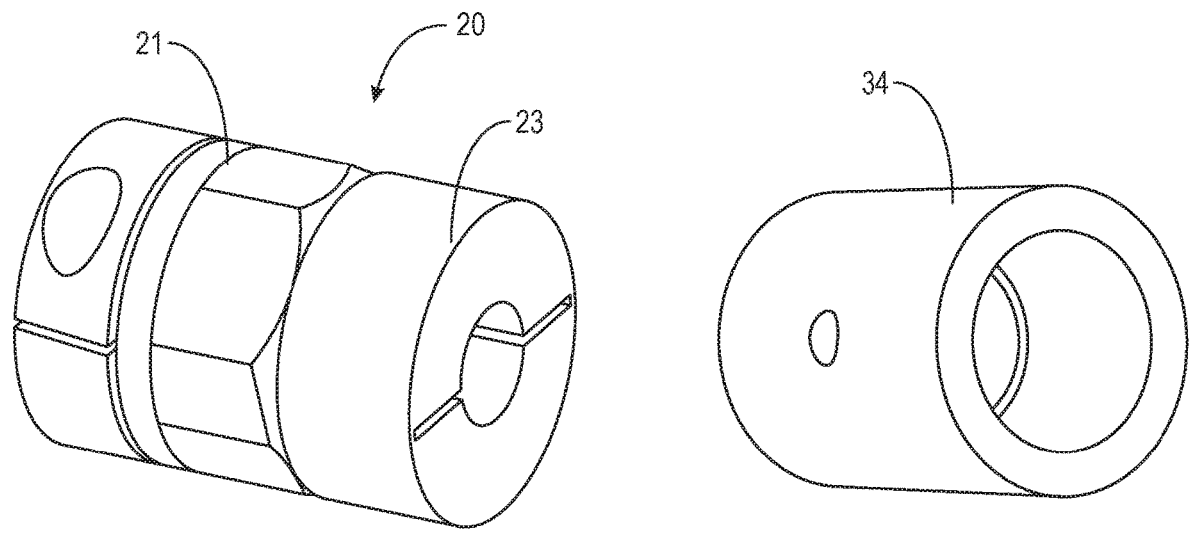
FIG. 5
FIG. 6
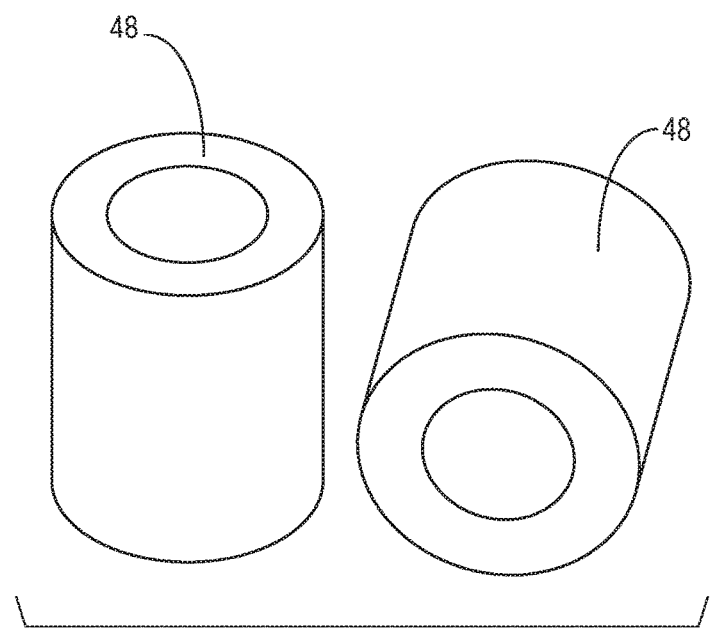
FIG. 7

US 11,518,018 B2

POWER TOOL WITH NON-CONDUCTIVE DRIVESHAFT

CROSS REFERENCE TO RELATED APPLICATION

This application claims priority to U.S. Provisional Patent Application No. 62/794,871, filed Jan. 21, 2019, the entire content of which is incorporated herein by reference.

FIELD OF THE INVENTION

The present disclosure relates to power tools, such as pole saws, and more particularly to power tools including non-conductive driveshaft and other non-conductive components to electrically isolate a user end of the power tool from a tool head.

BACKGROUND OF THE INVENTION

Power tools, such as pole saws, typically include a handle, a powerhead on one end of the handle, and a tool head on opposite end. A driveshaft extends between the powerhead and the tool head to drive a working component, such as saw. The driveshaft may be interchangeable by an operator. When the operator uses the power tool near a power line, there is a chance the saw may contact the power line and injure the operator. As such, there is a desire to electrically insulate the operator from the working component of the power tool.

SUMMARY OF THE INVENTION

The present invention provides, in one aspect, a power tool. The power tool includes an elongated shaft forming a handle. A tool head located at one end of the handle. The tool head having a working element and a driven shaft configured to drive the working element. A powerhead located at an opposite end of the handle and having an input shaft. A driveshaft extending between the tool head and the powerhead. The driveshaft being rotatably coupled to the input shaft and the driven shaft to transfer torque from the powerhead to the working element of the tool head. A bearing positioned between the input shaft of the powerhead and the driveshaft. A driveshaft sleeve positioned within the handle and surrounding the driveshaft. The driveshaft sleeve being positioned within the bearing to protect the driveshaft. At least a portion of the driveshaft is constructed of a non-conductive material to inhibit transmission of electricity from the working element to the powerhead.

In another aspect, the present invention provides a power tool. The power tool includes an elongated shaft forming a handle and a tool head located at one end of the handle. The tool head having a working element and a driven shaft configured to drive the working element. A powerhead located at an opposite end of the handle and having an input shaft. A driveshaft extending between the tool head and the powerhead. The driveshaft being rotatably coupled to the input shaft and the driven shaft to transfer torque from the powerhead to the working element of the tool head. At least a portion of the driveshaft extending between the powerhead and the working element is constructed of a non-conductive material to inhibit transmission of electricity from the working element to the powerhead.

Other features and aspects of the invention will become apparent by consideration of the following detailed description and accompanying drawings.

BRIEF DESCRIPTION OF THE DRAWINGS

FIG. 5 is a perspective view of an output drive gear of the pole saw of FIG. 1.

FIG. 6 is a perspective view of a shaft sleeve or shaft liner of the pole saw of FIG. 1.

FIG. 7 is a perspective view of a bushing or coating of the pole saw of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

DETAILED DESCRIPTION

Figure 1:
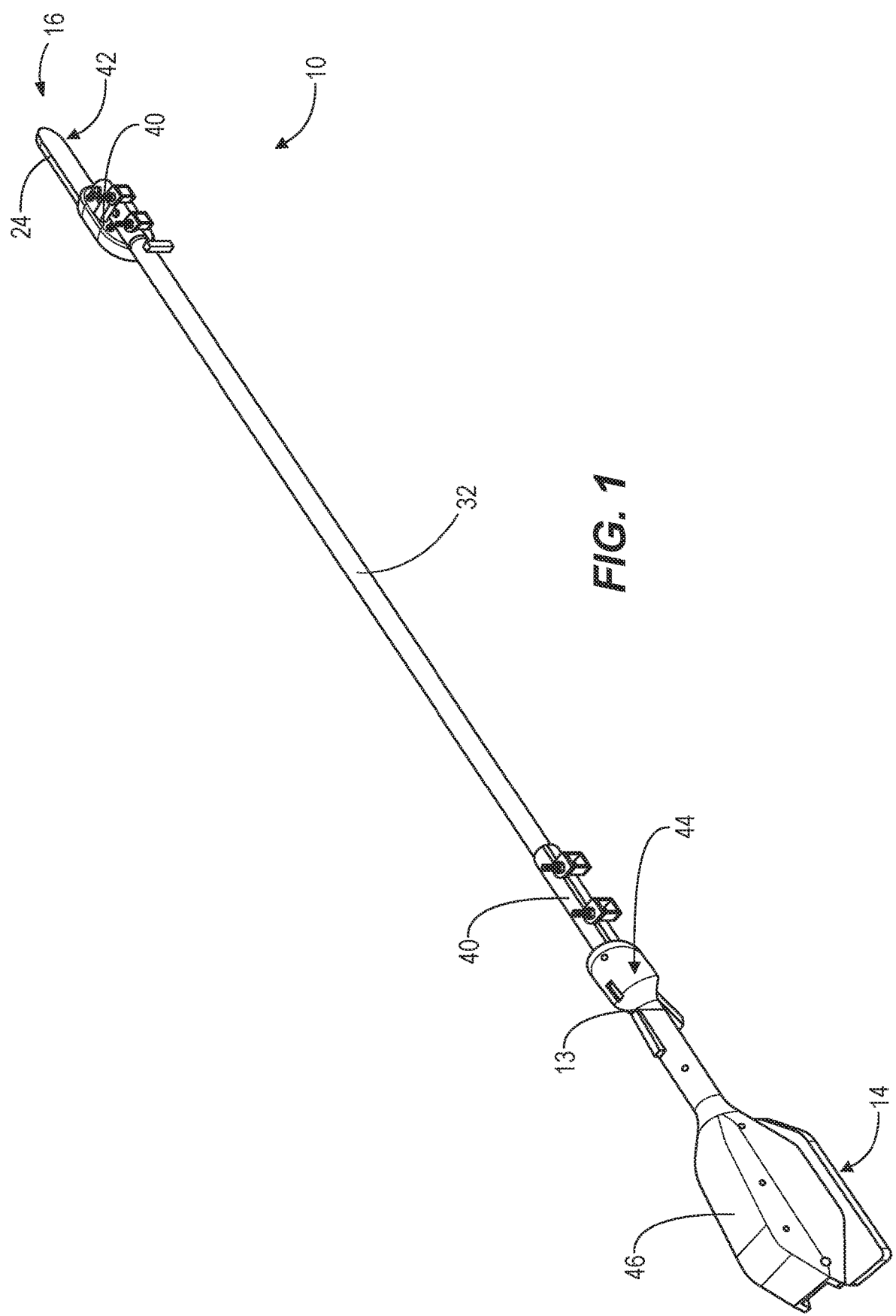
FIG. 1 is a perspective view of a pole saw according to one embodiment of the invention.
Figure 2:
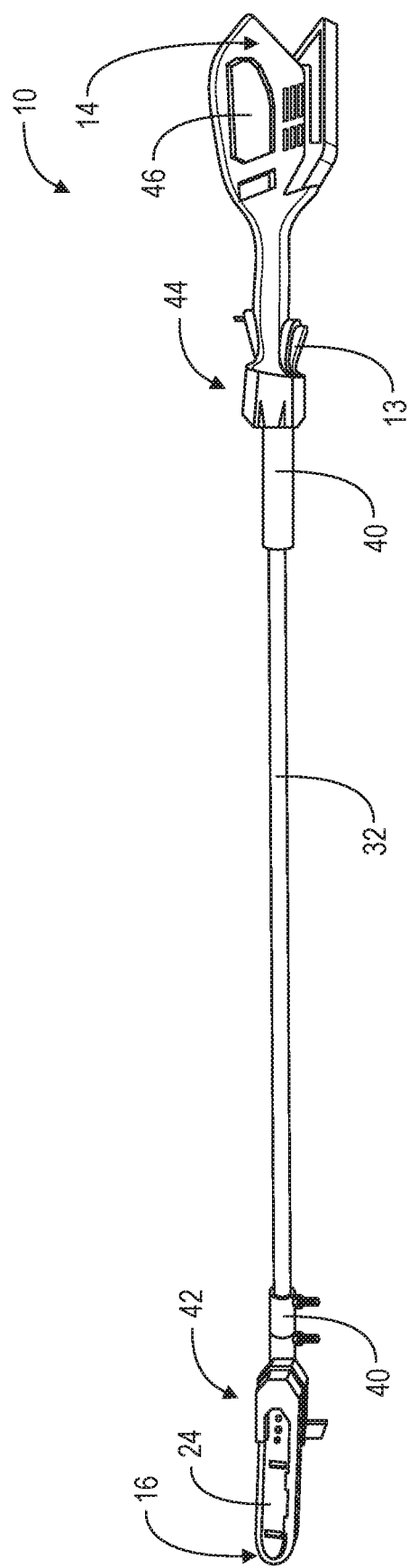
FIG. 2 is a side elevation view of the pole saw of FIG. 1.

FIGS. 1 and 2 illustrate a power tool 10, such as a pole saw, for use in performing outdoor tasks such as cutting tree branches. The power tool 10 includes an elongated shaft forming a handle 32, a tool or saw head 42 at one end of the handle 32, and a powerhead 46 at an opposite end of the handle 32. The tool head 42 includes a working element 24, such as a saw chain for performing cutting. The powerhead 46 includes a user-activated switch 13 to selectively generate a motive force to drive the working element 24 during operation of the power tool 10. In some embodiments, the powerhead 46 may be an electric motor powered by a removable battery pack (not shown) supported by the powerhead 46. In other embodiments, the powerhead 46 may be an internal combustion engine powered by a combustible fuel.

Figure 3:
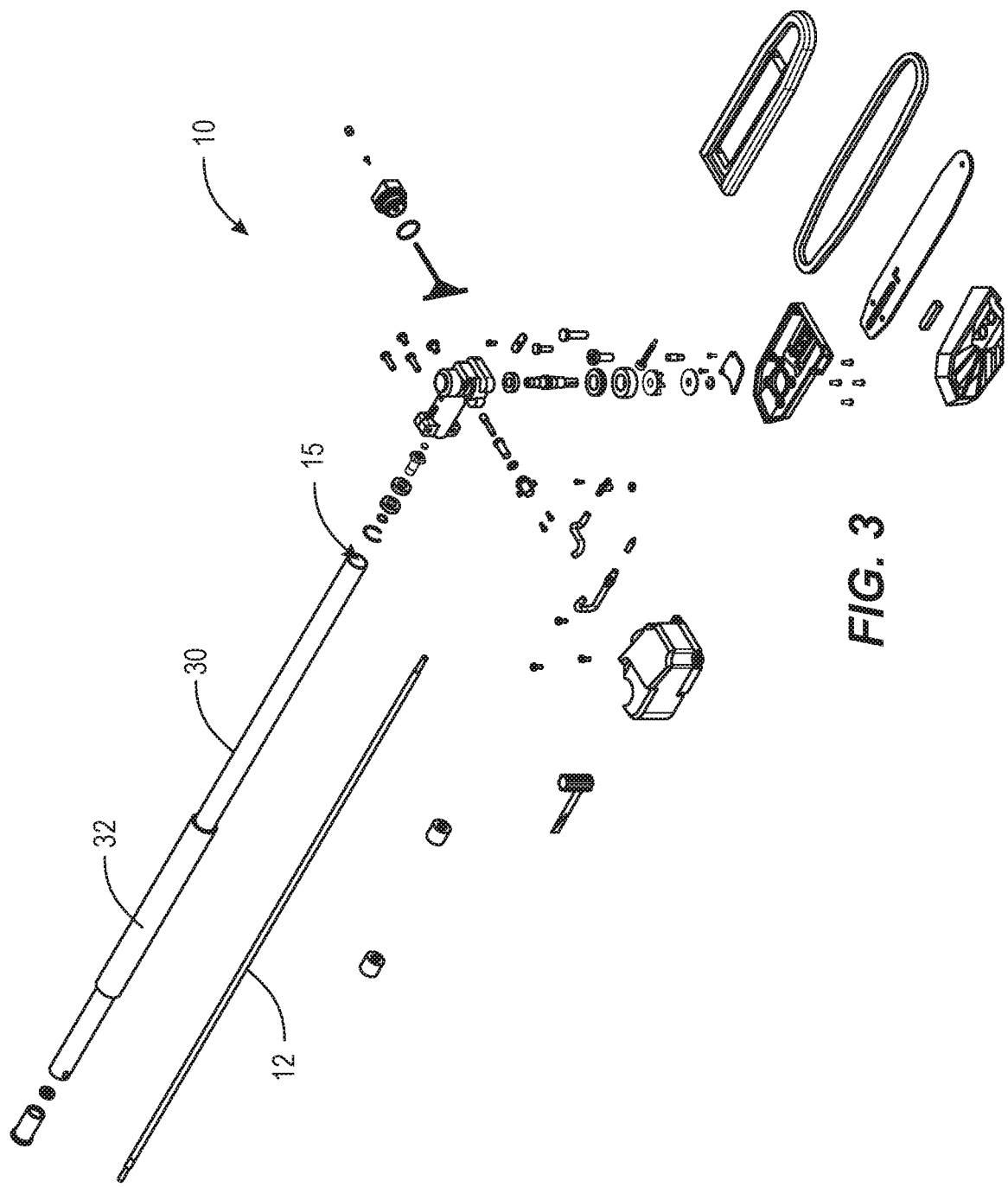
FIG. 3 is a partial exploded perspective view of the pole saw of FIG. 1.
Figure 4:
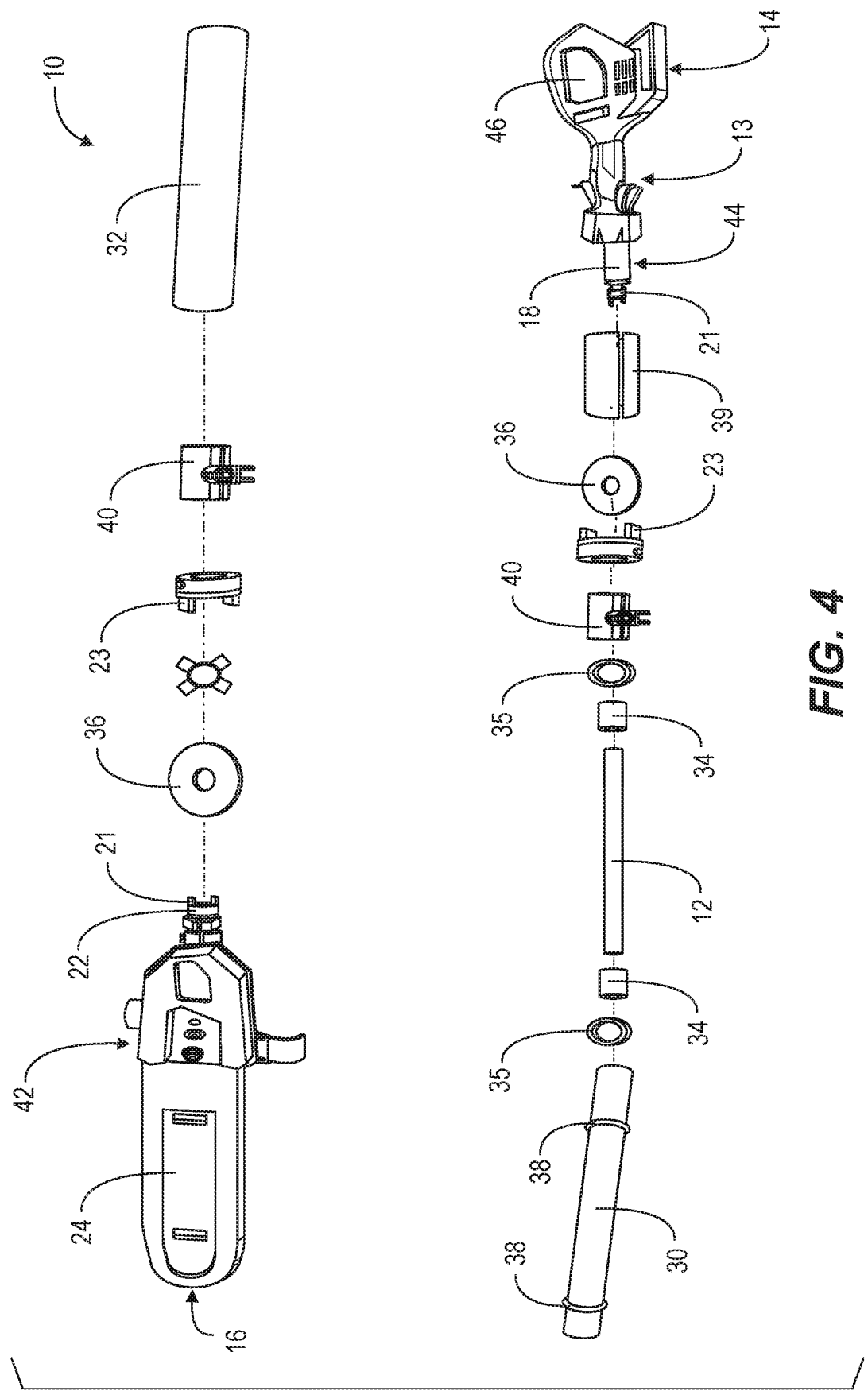
FIG. 4 is an exploded side elevation view of the pole saw of FIG. 1.

With reference to FIGS. 3 and 4, the handle 32 of the power tool 10 surrounds and supports an electrically non-conductive driveshaft 12. Due to the non-conductive material of the driveshaft 12 and the handle 32, the user end 14 of the power tool 10 is electrically insulated from the output end 16 of the power tool 10 (e.g., a chain or like working element). The driveshaft 12 is rotatably coupled to an input shaft 18 of the powerhead 46 by a first coupling 20 (FIG. 5) having a first securing portion 21 and a second securing portion 23. Similarly, the driveshaft 12 is rotatably coupled to a driven shaft 22 of the working element 24 with another or second coupling 20. In the illustrated embodiment, the first and second couplings 20 are jaw-type couplings 20 (FIG. 5) where the first securing portion 21 may be coupled to the powerhead 46 or the tool head 42, and the second securing portion 23 is coupled to the driveshaft 12. The jaw-type couplings 20 allow for slightly misaligned shaft couplings and may also reduce vibration felt by the user during operation of the power tool 10.

The power tool 10 may further include one or more washers 36 that surround the driveshaft 12 to hold the driveshaft 12 in position and protect the coupling 20 from wear or slipping out of position. As shown in FIGS. 1, 2, and 4, one or more clamps 40 couple the handle 32 with the tool head 42 and couple the handle 32 with an input end 44 of the powerhead 46. The clamps 40 may include, for instance, tube clamps or sleeve clamps. As a result, the handle 32 may be uncoupled from the powerhead 46 and the tool head 42 to repair the driveshaft 12 or other components of the handle. Due to the non-conductive material of the driveshaft 12, the connection between the non-conductive driveshaft 12 and other components of the power tool 10 that are formed of conductive material are important to reduce wear on the driveshaft 12 and ensure the tool head 42 is electrically insulated from the operator and the powerhead 46. Other embodiments of the power tool 10 include different attachment methods for the driveshaft 12. Some non-limiting examples include a press-fit between the driveshaft 12 and the input shaft 18 or an adhesive joining the driveshaft 12 and the input shaft 18.

With continued reference to FIGS. 3 and 4, the power tool 10 includes a greased tube 30 that defines an axial passageway 15 for the driveshaft 12 to ride in. The tube 30 may also be non-conductive to further electrically insulate the user end 14 of the power tool 10 from the output end 16. In the illustrated embodiment, the tube 30 is a separate component from and is positioned within the handle 32. In some embodiments, the tube 30 has an inner diameter of about 0.525 inches. In some embodiments, the handle 32 has an outer diameter of about 1.25 inches.

The non-conductive driveshaft 12 includes a driveshaft sleeve 34 pressed onto each end of the driveshaft 12 that rides inside a needle bearing 35 to protect the non-conductive material of the driveshaft 12 from wearing due to direct interaction with the needle bearing 35. In such embodiments, the driveshaft sleeve 34 may be constructed of a metallic material (e.g., steel, aluminum, etc.) and may have an inner diameter of 0.5 inches, an outer diameter of 0.75 inches, and a length of 1 inch. The tube 30 may surround the driveshaft 12 and the driveshaft sleeves 34. The corresponding needle bearing 35 may have an inner diameter of 0.75 inches and an outer diameter of 1 inch. In some embodiments, the driveshaft sleeve 34 may be coupled to an adapter sleeve 39 to secure the driveshaft 12 to the input shaft 18. The tube 30 may also be spaced from the handle 32 by one or more spacers, or O-rings, 38. These spacers 38 may surround the tube 30 and function to properly position the tube 30 within the handle 32 and also may reduce vibration experienced by the user.

Referring to the electrically non-conductive driveshaft 12 of the power tool 10, as shown in FIGS. 3 and 4, the drive shaft 12 can include any appropriate non-conductive material, non-limiting examples of which include fiberglass, fiberglass reinforced plastic, wood, PVC, PEX, any other plastic or polymer, a composite material, and the like. In some embodiments, the driveshaft 12 includes at least one section of non-conductive material such that a portion of the length of the driveshaft 12 is non-conductive. This non-conductive material section can be less than half of the length of the driveshaft 12. Other embodiments of the power tool 10 include the non-conductive material section being less than a third of the length of the driveshaft 12. Still, other embodiments of the power tool 10 include the entire driveshaft 12 being made of non-conductive material.

Due to the non-conductive material of the drive shaft 12, the user end 14 of the power tool 10 and the operator are electrically insulated from the output end 16 of the power tool 10 (e.g., a chain or like working element). In one embodiment of the power tool 10, the driveshaft 12 is configured to withstand 328,100 Volts per meter of length or more for at least 5 minutes.

In some embodiments, the driveshaft 12 is made from a fiberglass reinforced plastic so the driveshaft 12 can withstand 328,100 volts per meter (100,000 volts per foot) of length for 5 minutes. In other embodiments, the driveshaft 12 is made from wood or a wood composite and can withstand 246,100 volts per meter (75,000 volts per foot) of length for 3 minutes.

During operation of the power tool 10, the driveshaft 12 may be configured to spin at about 10,000 revolutions per minute. The driveshaft 12 is further configured to experience a torque of about 1 to 2 ft-lbs. In some embodiments, the driveshaft 12 has an outer diameter of 0.5 inches and has a length of about 5 feet. In some embodiments, the driveshaft 12 is strengthened. For fiberglass driveshafts 12, the glass content may be higher than typical fiberglass.

With reference to FIGS. 6 and 7, the power tool 10 may include one or more non-conductive bushings 48 that are disposed within the handle 32. The one or more non-conductive bushings 48 may surround the coating or driveshaft sleeve 34 (FIG. 6) so the driveshaft sleeve 34 rides inside the one or more non-conductive bushings 48 (FIG. 7) on each side of the driveshaft 12. The bushings 48 or the coating may cover or surround segments of the non-conductive driveshaft 12 or the entire length of the driveshaft 12.

Figure 8:
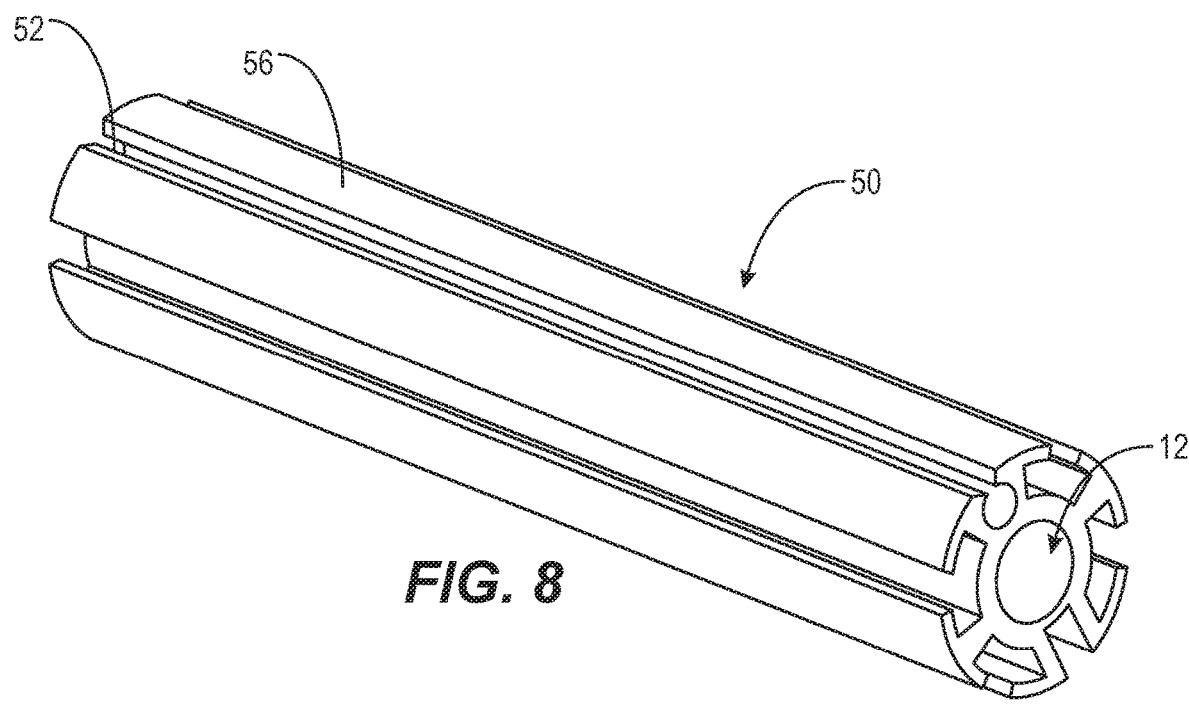
FIG. 8 is a perspective view of an alternative handle with a driveshaft sleeve forming a single unitary part therewith.

With reference to FIG. 8, a driveshaft alignment structure 50 is disclosed. The driveshaft alignment structure 50 may be used in place of the driveshaft sleeve 34 or in conjunction with the driveshaft sleeve 34 to support the driveshaft 12 within the handle 32. The driveshaft alignment structure 50 includes a grooved outer structure 52 and may include supports 56 or O-rings (not shown) located along the length of the driveshaft alignment structure 50 that engage with an inner diameter of the handle 32. The driveshaft alignment structure 50 may dampen the vibration of the power tool and align the driveshaft 12 in the center of the handle 32. In some embodiments, the driveshaft alignment structure 50 may be formed as an extrusion within the handle 32.

Figure 9:
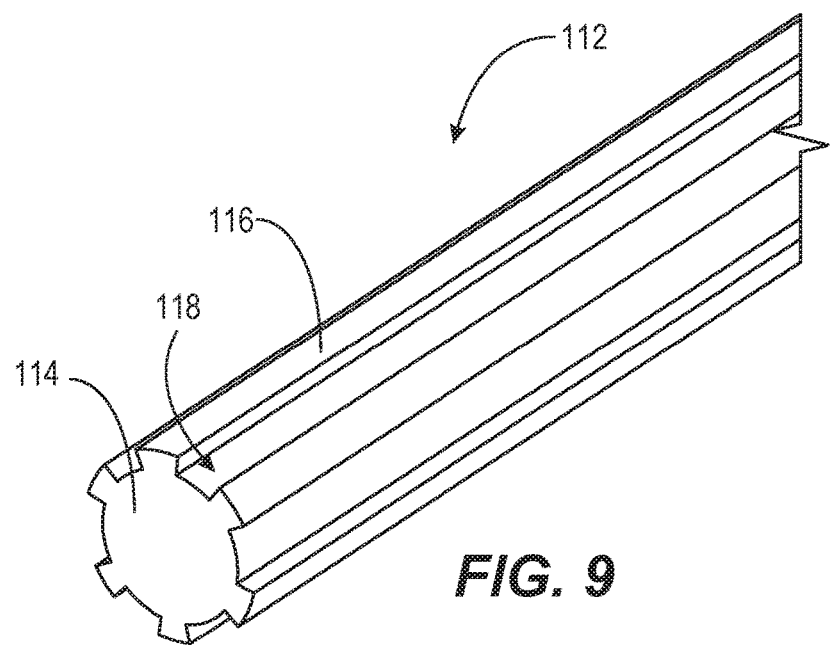
FIG. 9 is a partial perspective view of an alternative geometry of a driveshaft of the pole saw of FIG. 1.

FIG. 9 illustrates another embodiment of a driveshaft 112. The driveshaft 112 is similar to the driveshaft 12 described above with reference to FIGS. 1-7, and the following description focuses primarily on differences between the driveshaft 112 and the driveshaft 12. The driveshaft 112 is constructed of a non-conductive material and includes a main body 114, splines or ribbings 116 extending outward from the main body 114, and a gap 118 positioned between adjacent splines 116. The splines 116 may extend along the length of the driveshaft 112. In some embodiments, an internal surface of an input shaft of a powerhead, similar to powerhead 46, may be splined and received in the plurality of gaps 118 to engage with the plurality of splines 116 and transmit torque to the driveshaft 112. In some embodiments, the main body 114 may be formed of a first non-conductive material and the splines 116 may be formed of a second non-conductive material that is stronger or reinforced. For example, the driveshaft 112 may be formed from a material having a higher amount of glass content than typical fiberglass. In other embodiments, the splines may be formed of a non-conductive material, while the body is formed of a conductive material.

Figure 10:
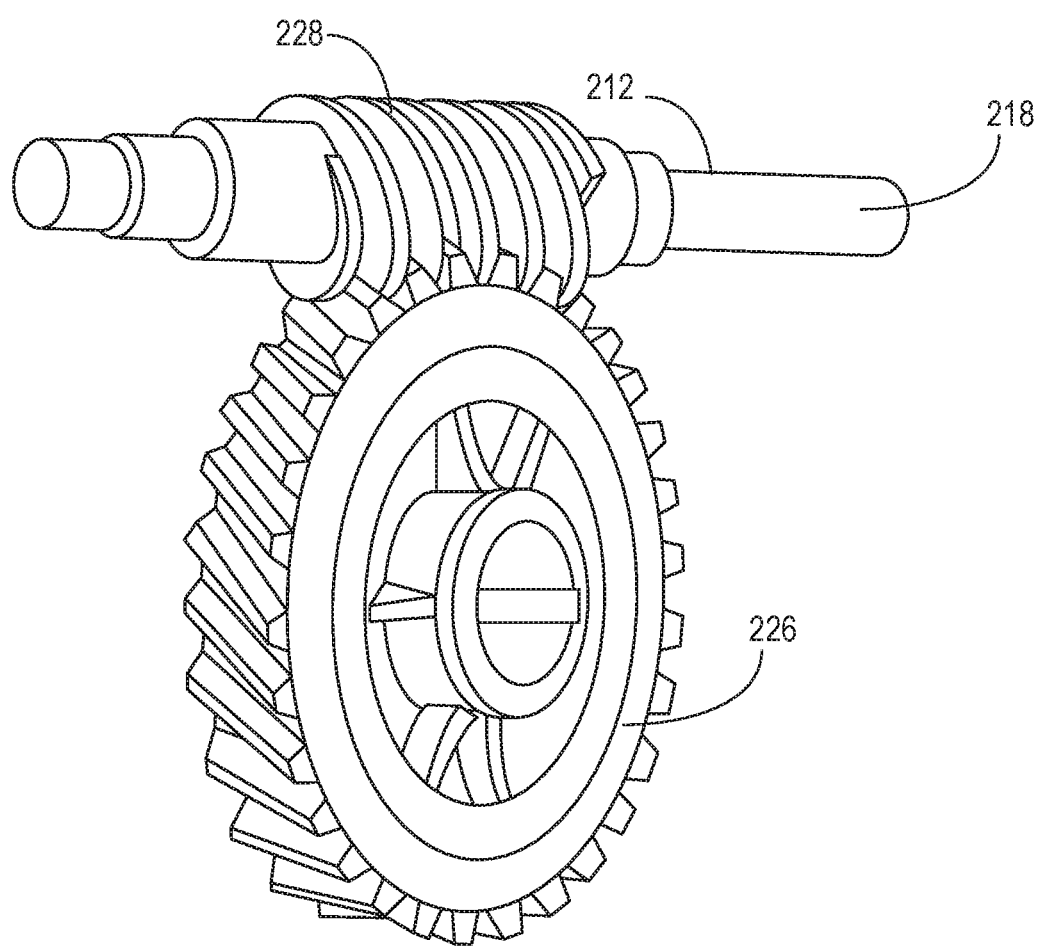
FIG. 10 is a perspective view of an alternative output drive gear of the pole saw of FIG. 1.

FIG. 10 illustrates another embodiment of a driveshaft 212. The driveshaft 212 is similar to the driveshaft 12 and the driveshaft 112 described above with reference to FIGS. 1-9, and the following description focuses primarily on differences between the driveshaft 212 and the driveshafts 12, 112. The driveshaft 212 is constructed of a non-conductive material and includes an input shaft 218. The input shaft 218 may be directly connected to a powerhead, similar to the powerhead 46, so the driveshaft 212 may be formed of a single unitary piece. In the illustrated embodiment, the driveshaft 212 includes a drive gear 228 that is formed on outer diameter of the driveshaft 212 and engages with a driven shaft or an output gear 226. The output gear 226 may be configured to drive a tool head, similar to the tool head 42. The drive gear 228 may be formed of non-conductive material stronger or reinforced compared to the non-conductive material of the rest of the drive shaft 212.

Figure 11:
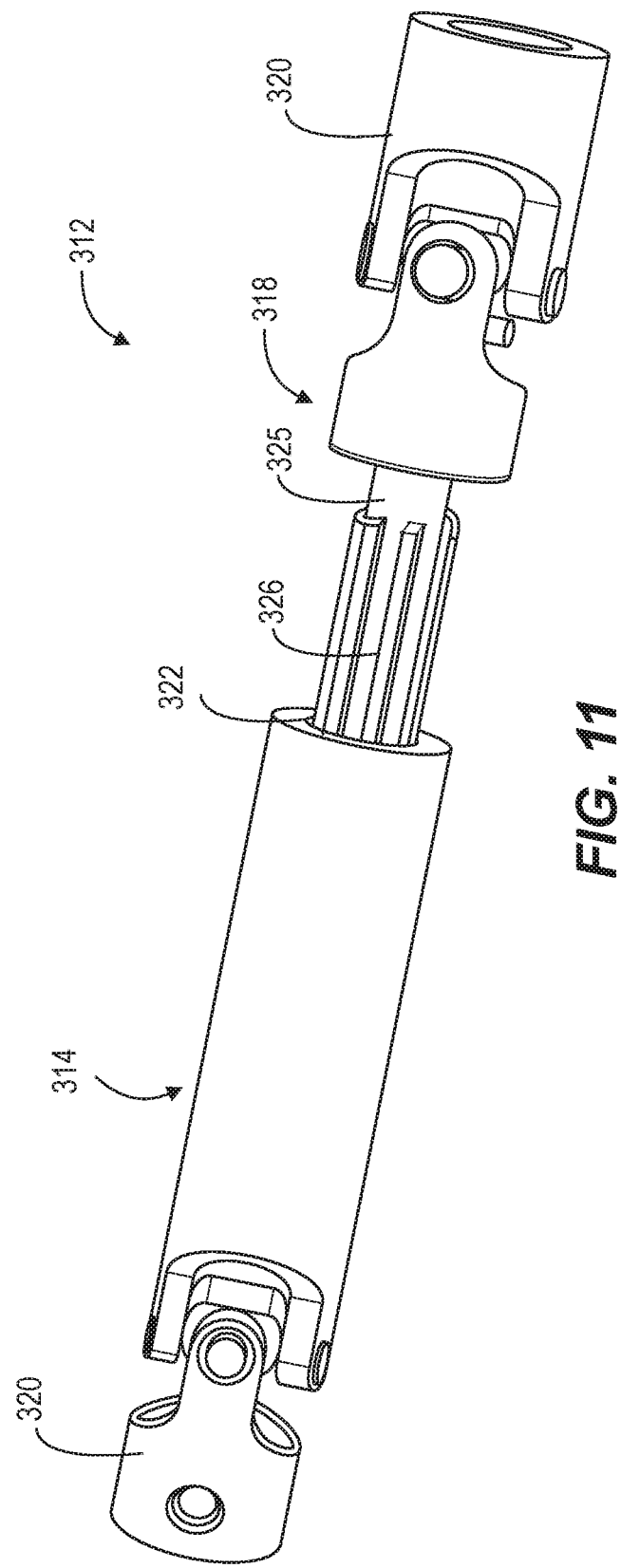
FIG. 11 is a perspective view of an alternative driveshaft that is telescopic.

FIG. 11 illustrates yet another embodiment of a driveshaft 312. The driveshaft 312 is similar to the driveshaft 12, the driveshaft 112, and the driveshaft 212, described above with reference to FIGS. 1-10, and the following description focuses primarily on differences between the driveshaft 132 and the driveshafts 12, 112, 212. The driveshaft 312 includes a first driveshaft portion 314 having an internal bore 322 and a second driveshaft portion 318 having an external surface 325 sized to be received in the internal bore 322. In the illustrated embodiment, the external surface includes a splined external surface 326. The internal slide 322 is sized to receive the splined external surface 326 to allow the driveshaft 312 to be telescoping or otherwise adjustable. In some embodiments, one or both of first driveshaft portion 314 and the second driveshaft portion 318 may be constructed of a non-conductive material. In other embodiments, the splined external surface 326 may be constructed of non-conductive material.

In some embodiments, the external surface 325 may include a stop that restricts the travel distance of the first driveshaft portion 314 relative to the second driveshaft portion 318 so the first and second drive shaft portions 314, 318 do not separate. The driveshaft 312 is coupled to first and second couplings 320 that attach the driveshaft 312 to a tool head and a powerhead, similar to the tool head 42 and powerhead 46.

Although the invention has been described in detail with reference to certain preferred embodiments, variations and modifications exist within the scope and spirit of one or more independent aspects of the invention as described. Various features and advantages of the present subject matter are set forth in the following claims.

The invention claimed is:
1. A power tool comprising:
   an elongated shaft forming a handle;
   a tool head located at one end of the handle, the tool head having a working element and a driven shaft configured to drive the working element;
   a powerhead located at an opposite end of the handle, the powerhead having an input shaft;
   a driveshaft extending between the tool head and the powerhead, the driveshaft being rotatably coupled to the input shaft and the driven shaft to transfer torque from the powerhead to the working element of the tool head;
   a bearing positioned between the input shaft of the powerhead and the driveshaft; and
   a driveshaft sleeve positioned within the handle and surrounding the driveshaft, the driveshaft sleeve being positioned within the bearing to protect the driveshaft;
   wherein at least a portion of the driveshaft is constructed of a non-conductive material to inhibit transmission of electricity from the working element to the powerhead.

2. The power tool of claim 1, wherein the driveshaft sleeve is a first driveshaft sleeve coupled to a first end of the driveshaft, and a second driveshaft sleeve is coupled to a second end of the driveshaft.

3. The power tool of claim 2, wherein the first driveshaft sleeve and the second driveshaft sleeve are constructed of a metallic material.

4. The power tool of claim 1, further comprising a first coupling for attaching the driveshaft to the input shaft and a second coupling for attaching the driveshaft to the driven shaft of the working element.

5. The power tool of claim 1, wherein the entire driveshaft is formed of the non-conductive material.

6. The power tool of claim 1, further comprising a tube positioned within the handle that surrounds the driveshaft and the driveshaft sleeve to define an axial passageway for the driveshaft to ride in, wherein the tube is constructed of a non-conductive material.

7. The power tool of claim 1, wherein the handle is constructed of a non-conductive material.

8. The power tool of claim 1, further comprising a bushing surrounding the driveshaft sleeve, wherein the bushing is non-conductive.

9. The power tool of claim 1, wherein the driveshaft is made from a fiberglass reinforced plastic, wherein the driveshaft is configured to withstand 328,100 Volts per meter of length or more for at least 5 minutes.

10. The power tool of claim 1, wherein the driveshaft is made from wood or a wood composite wherein the driveshaft is configured to withstand 246,100 volts per meter of length for 3 minutes.

11. A power tool comprising:
   an elongated shaft forming a handle;
   a tool head located at one end of the handle, the tool head having a working element and a driven shaft configured to drive the working element;
   a powerhead located at an opposite end of the handle, the powerhead having an input shaft;
   a driveshaft extending between the tool head and the powerhead, the driveshaft being rotatably coupled to the input shaft and the driven shaft to transfer torque from the powerhead to the working element of the tool head;

wherein at least a portion of the driveshaft extending between the powerhead and the working element is constructed of a non-conductive material to inhibit transmission of electricity from the working element to the powerhead.

12. The power tool of claim 11, wherein the driveshaft further comprises:
a first driveshaft portion having an internal bore, and
a second driveshaft portion having a splined external surface, and
wherein the internal bore is sized to receive the splined external surface of the second driveshaft portion to allow the driveshaft to be telescoping.

13. The power tool of claim 12, wherein at least one of the first driveshaft portion and the second driveshaft portion is constructed of the non-conductive material.

14. The power tool of claim 12, wherein the splined external surface of the second driveshaft portion is constructed of the non-conductive material.

15. The power tool of claim 11, wherein the non-conductive material is a fiberglass reinforced plastic, wherein the non-conductive material is configured to withstand 328,100 Volts per meter of length or more for at least 5 minutes.

16. The power tool of claim 11, wherein the non-conductive material wood or a wood composite, wherein the non-conductive material n is configured to withstand 246,100 volts per meter of length for 3 minutes.

17. The power tool of claim 11, wherein the driveshaft and the input shaft of the powerhead are formed as of a single unitary piece wherein the driveshaft includes a drive gear that is formed on outer diameter of the driveshaft and that engages with the driven shaft of the tool head.

18. The power tool of claim 17, wherein the drive gear is constructed of a reinforced non-conductive material having a higher glass content than fiberglass.

19. The power tool of claim 11, wherein the driveshaft includes a main body, splines extending outward from the main body, and a gap positioned between adjacent splines.

20. The power tool of claim 11, wherein the splines are formed of a non-conductive material.

* * * * *